R. C. H. MEYER.
EXPLOSION ENGINE FUEL HEATER AND VAPORIZER.
APPLICATION FILED FEB. 7, 1920.

1,359,189.

Patented Nov. 16, 1920.

WITNESS:
Ed J. Clark.
F. W. Roeder.

INVENTOR:
Robert C. H. Meyer,
BY
E. T. Silvius,
ATTORNEY.

UNITED STATES PATENT OFFICE.

ROBERT C. H. MEYER, OF INDIANAPOLIS, INDIANA, ASSIGNOR OF ONE-THIRD TO MAUD C. MEYER, OF INDIANAPOLIS, INDIANA.

EXPLOSION-ENGINE FUEL HEATER AND VAPORIZER.

1,359,189.  Specification of Letters Patent.  Patented Nov. 16, 1920.

Application filed February 7, 1920. Serial No. 356,986.

*To all whom it may concern:*

Be it known that I, ROBERT C. H. MEYER, a citizen of the United States, residing at Indianapolis, in the county of Marion and State of Indiana, have invented a new and useful Explosion-Engine Fuel Heater and Vaporizer, of which the following is a specification, reference being had to the accompanying drawings and to the letters and figures of reference marked thereon.

This invention relates to the application of an electrical heater in a fuel-conduit leading to an explosion engine, for heating and vaporizing or more completely vaporizing carbureted air to form explosive mixture for the engine, the invention having reference more particularly to a heater and vaporizer that is designed to be inserted into an explosion engine intake manifold or conduit leading thereto.

An object of the invention is to provide simple and efficient means whereby to conveniently heat gaseous fuel while passing to an explosion engine, more especially when kerosene is used, which heater shall be of such construction as to permit of production and application at small cost and not be liable to be damaged or deranged.

Another object is to provide an improved explosion engine fuel heater of such construction as to be adapted to be readily applied to engines which have already been delivered from the factory for use.

A further object is to provide an improved electrical heater and vaporizer which shall be of unitary form and adapted to be applied for use without structural changes of the engines in motor vehicles, and which shall be reliable, durable and economical in use.

With the above-mentioned and other objects in view, the invention consists in a plug or casing adapted to be screwed into a threaded hole in the wall of a pipe or intake manifold, the plug having an electrical heater on its end to project into the pipe or manifold, the heater preferably having external ribs or projections adapted to radiate heat and to afford devices tending to vaporize passing fuel; and, the invention consists also further in the parts and combinations and arrangements of parts as hereinafter particularly described and further defined in the accompanying claims.

Figure 1:
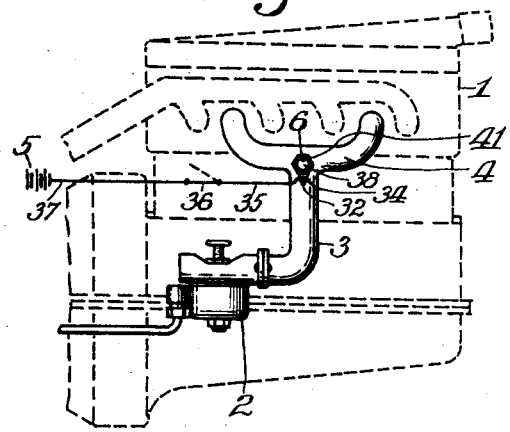
Figure 2:
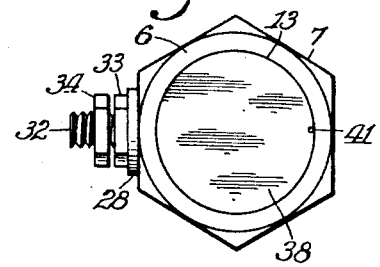
Figure 3:
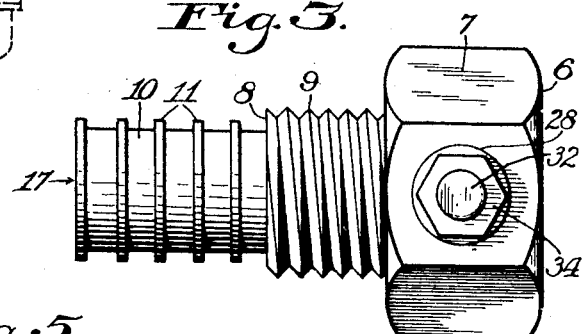
Figure 4:
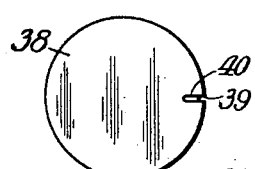
Figure 5:
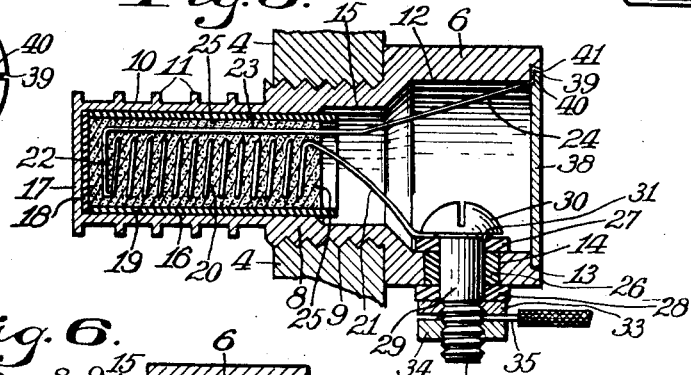
Figure 6:
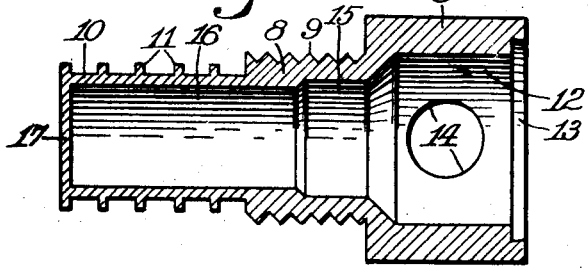
Figure 7:
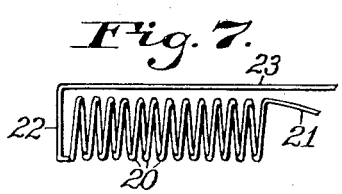

Referring to the drawings, Figure 1 is an elevation of a common type of explosion engine, shown by broken lines, and a manifold and carbureter connected therewith to which the invention is applied; Fig. 2 is a front end view of the improved heater and vaporizer; Fig. 3 is a side view of the heater and vaporizer on a relatively larger scale; Fig. 4 is a plan of the inner side of a cap plate preferably comprised in the invention; Fig. 5 is a longitudinal central section of the improved heater and vaporizer connected with a fragment of the intake manifold; Fig. 6 is a longitudinal central section of the main part of the heater and vaporizer; and, Fig. 7 is a side view of an electrical resistance coil comprised in the heater and vaporizer.

Similar reference characters in the different figures of the drawings indicate corresponding elements or features of construction herein referred to in detail.

In the drawings the numeral 1 indicates an explosion engine, 2 a carbureter commonly used for carbureting air, 3 the intake pipe or conduit extending from the carbureter and 4 the intake manifold connected with the conduit and the engine. In the present case a source of electricity, as a battery 5 is required for operation of the heater and vaporizer.

As preferably constructed the heater and vaporizer comprises a hollow plug or a plug having a chamber adjacent to one end thereof, the plug comprising a head portion 6 preferably having a hexagonal exterior 7, a body or shank portion 8 that is smaller diametrically than the head portion and having external screw threads 9, whereby to secure the plug in a screw-threaded hole in the wall of the conduit or manifold. The body or shank portion has a heater portion 10 on its end which preferably has external ribs 11 to radiate heat and assist in vaporizing the passing fluid. The head portion 6 has a bore 12 extending from its front end and a counter bore 13 in the front end to receive a closure cap-plate, it being preferable to close the front end of the bore. The wall of the head portion 6 has an aperture 14 therein to receive a binding post. The body or shank portion 8 has a relatively smaller bore 15 extending from the bore 12, and the heater portion 10 has a continuing bore 16 and also an end wall 17 closing the end of the bore. The metal of the wall of the portion 10 and the wall 17 are sufficiently thin to permit prompt radiation of heat.

The interior of the heating portion of the plug is provided with a suitable insulator, the metal of the plug being an electrical conductor, and preferably a liner 18 of mica is placed against the inner side of the end wall 17 and a tubular liner 19 of mica placed in the bore 16 to extend against the liner 18. A wire coil 20 adapted to constitute an electrical resistance coil is provided and arranged in the chamber of the heater and may extend into the shank portion of the plug, and it has a conducting wire 21 connected with one end thereof and extending into the bore or chamber, the opposite end of the coil having a grounding wire 22 connected therewith which may be variously connected with the wall of the plug, preferably an extension wire 23 being connected with the grounding wire and having a terminal portion 24 connected therewith that extends into the bore 12 in which it is suitably connected to the wall of the head portion 6.

The resistance coil is suitably supported to guard against fracture thereof, preferably by means of suitable material which may be poured into the heater chamber and inclose the coil and connecting wires, as a plastic substance 25 to become set after being placed in position. Such substance should permit heat to be radiated from the coil to the wall of the heater portion and may be electrically insulating, and in the latter case the mica lining may be omitted.

In the aperture 14 an electrically insulating lining is arranged which preferably consists of a bushing 26 and flange washers 27 and 28 on the ends of the bushing. A binding post or screw 29 is arranged in the insulation and has a head 30 arranged within the bore 12. The circuit wire 21 has a ring 31 thereon which is secured by the head 30 against the washer 27, so as to have contact with the binding post. The binding post has a screw-threaded outer portion 32 on which nuts 33 and 34 are arranged to secure a circuit wire 35 to the binding post. The wire 35 is connected with a switch 36 by which connection is made with a circuit wire 37 connected with the battery 5.

The front end of the bore 12 preferably is closed and the closure is inexpensively accomplished by means of a cap plate 38 composed of sheet metal which is tightly pressed into the counter bore 13, the plate having a small slot 39 in its edge from which extends a groove 40 to receive the grounding wire 24 which has a terminal 41 shaped to conform to the counter bore 13 and fit closely in the slot and the groove, the plate conveniently securing the grounding wire to the hollow plug.

In practical use, when it is found desirable to heat the fuel in order to be able to promptly start the engine, more particularly when the base of the fuel is kerosene, or in cold seasons, the electrical switch is operated to close the circuit through the heater coil, the coil becoming heated and causing the wall of the heater portion 10 to become heated. The engine may then be put in motion by means of a suitable starter, so as to draw the fuel through the intake manifold, resulting in the fuel becoming heated in passing and in contact with the electrical heater, the heater which projects into the conduit operating as a baffle to assist in causing thorough mixture of the fuel constituents, while improving the vaporization so that the engine may be supplied with the most perfect fuel much desired.

Having thus described the invention, what is claimed as new is—

1. A fuel heater including a hollow plug comprising a head portion and a heater portion and also a shank portion intermediately of the other portions, the shank portion being diametrically larger than the heater portion and smaller than the head portion externally and having external screw threads thereon, the wall of the heater portion being thinner than the wall of the shank portion, a binding post mounted in the wall of the head portion, and an electrical resistance coil arranged in the heater portion of the plug and having circuit wires extending therefrom into the head portion of the plug, one of the wires being connected to the binding post and the other to the wall of the head portion.

2. A fuel heater including a hollow plug having a head portion and also a shank portion extending from the head portion to support the plug, the plug having also a heater portion extending from the shank portion and being closed at its end, the wall of the heater portion being thinner than the walls of the remaining portions of the plug, the end of the head portion of the plug having a closure therein, a binding post mounted in the wall of the head portion of the plug and electrically insulated therefrom and an electrical resistance coil arranged in the heater portion of the plug and having means to support the coil and electrically insulate it from the heater portion, the coil having a circuit wire extending out into said head portion and connected therein to the binding post and having also a terminal extending out into said head portion and connected with the wall thereof.

3. A fuel heater and vaporizer including a hollow plug having a relatively small portion diametrically, the diametrically larger portion of the plug having a binding post in the wall thereof, the smaller portion having an electrically insulating lining therein, and an electrical resistance coil arranged in the insulating lining and having a circuit wire extending out beyond the lining and connected with the binding post, the coil having also a terminal extending out beyond the lining and connected with the wall of the larger portion of the plug.

4. In an electrical heater, the combination of a plug comprising a head portion and a shank portion and also a heater portion, each portion having a bore, the heater portion having an end wall closing the bore therein, the head portion having an aperture in the wall thereof, a binding post in said aperture and insulated from the wall thereof, said post being secured to said wall, an electrical resistance coil arranged in the bore in said heater portion, a circuit wire connected with one end of said coil and with said post, a grounding wire connected with the opposite end of said coil and extending to the wall of said head portion, and a cap secured to said head portion and closing the bore therein, said cap engaging said grounding wire and securing it to said head portion wall.

5. In an electrical explosion engine fuel heater and vaporizer, the combination with the fuel-conduit of the explosion engine, of a hollow plug comprising a head portion and a shank portion and also a heater portion, said shank portion being secured in the wall of said fuel-conduit and supporting said heater portion within the fuel-conduit, a binding post secured in the wall of said head portion, a cap plate connected to the front of said head portion and having a slot in the edge thereof, an electrical resistance coil arranged in said heater portion and electrically insulated from the wall thereof, a circuit wire connected with one end of said coil and extending into said head portion in which it is connected to said post, a grounding wire connected with the opposite end of said coil and extending also into said head portion and into the slot in said cap plate whereby it is secured to the wall of said head portion, and a device in said heater portion bodily supporting said coil therein.

In testimony whereof, I affix my signature in presence of two witnesses.

ROBERT C. H. MEYER.

Witnesses:
  O. S. WHITEMAN,
  E. T. SILVIUS.